United States Patent
Cummins et al.

(10) Patent No.: US 7,021,355 B2
(45) Date of Patent: Apr. 4, 2006

(54) DISC TRAY ERROR SYSTEM

(75) Inventors: Robert P. Cummins, Deephaven, MN (US); Todd A. Britz, Maple Grove, MN (US); Michael R. Tolrud, Chaska, MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

(21) Appl. No.: 10/768,262

(22) Filed: Jan. 30, 2004

(65) Prior Publication Data

US 2005/0167055 A1    Aug. 4, 2005

(51) Int. Cl.
*B32B 31/00*    (2006.01)

(52) U.S. Cl. ............... 156/364; 156/363; 156/582; 700/302

(58) Field of Classification Search ........... 156/64, 156/350, 352, 360, 362, 363, 364, 555, 580, 156/582, 583.1; 700/114, 302, 90, 95
See application file for complete search history.

(56) References Cited

U.S. PATENT DOCUMENTS

| | | | | |
|---|---|---|---|---|
| 4,714,504 A | * | 12/1987 | Cummings et al. ........... 156/64 |
| 4,728,386 A | * | 3/1988 | Horvath ..................... 156/361 |
| 5,275,684 A | * | 1/1994 | Marazzi et al. ............ 156/359 |
| 5,518,325 A | | 5/1996 | Kahle ......................... 400/70 |
| 5,542,768 A | | 8/1996 | Rother et al. .......... 400/120.16 |
| 5,549,444 A | | 8/1996 | Dubuit .................... 414/796.7 |
| 5,734,629 A | | 3/1998 | Lee et al. .................... 369/34 |
| 5,873,692 A | | 2/1999 | Costas .................... 414/796.9 |
| 5,927,208 A | | 7/1999 | Hagstrom et al. .......... 101/486 |
| 5,934,865 A | | 8/1999 | Meadows ................ 414/796.9 |
| 5,946,216 A | | 8/1999 | Hollerich ............... 364/478.11 |
| 6,021,029 A | | 2/2000 | Mamiya et al. ............. 360/133 |
| 6,111,847 A | | 8/2000 | Assadian .................... 369/178 |
| 6,141,298 A | | 10/2000 | Miller ......................... 369/30 |
| 6,148,722 A | | 11/2000 | Hagstrom .................... 101/35 |
| 6,222,800 B1 | | 4/2001 | Miller et al. ................. 369/36 |
| 6,270,176 B1 | | 8/2001 | Kahle ........................... 347/2 |
| 6,302,601 B1 | | 10/2001 | Hagstrom et al. .......... 400/283 |
| 6,321,649 B1 | | 11/2001 | Vangen et al. ............... 101/35 |
| 6,327,230 B1 | | 12/2001 | Miller et al. ................. 369/34 |
| 6,332,680 B1 | | 12/2001 | Ozawa ....................... 347/104 |
| 6,400,659 B1 | | 6/2002 | Kitaoka ....................... 369/34 |
| 6,414,921 B1 | * | 7/2002 | Kim ....................... 369/47.44 |
| 6,447,181 B1 | | 9/2002 | Hagstrom et al. ..... 400/120.01 |
| 6,580,444 B1 | | 6/2003 | Drynkin et al. ............ 347/171 |
| 6,808,581 B1 | * | 10/2004 | Kuta et al. .................. 156/187 |

FOREIGN PATENT DOCUMENTS

| | | |
|---|---|---|
| EP | 0 799 710 A1 | 10/1997 |
| EP | 1 120 785 A1 | 8/2001 |
| JP | 2002056584 | 2/2002 |

* cited by examiner

*Primary Examiner*—James Sells
(74) *Attorney, Agent, or Firm*—Westman, Champlin & Kelly, P.A.

(57) ABSTRACT

A processor, such as a laminator for laminating a film onto a disc, such as a CD, DVD or the like has a tray for holding a disc for movement from a loading position to a processing position. The tray has a recess for receiving the disc, when the disc is properly positioned for processing. A sensor is provided to sense when a disc is not properly located in the recess, or when more than one disc, a warped disc or some other anomaly is present that may damage the processor. As shown, the processor is a laminator for laminating a film onto an upper surface of a disc.

13 Claims, 8 Drawing Sheets

DISC TRAY ERROR SYSTEM

CROSS REFERENCE TO RELATED APPLICATIONS

Reference is made to U.S. patent application Ser. No. 10/688,862, filed Oct. 17, 2003 for LAMINATOR FOR APPLYING A PROTECTIVE LAYER TO A DISC, the contents of which is incorporated by reference.

BACKGROUND OF THE INVENTION

The present invention relates to an error detection system to sense when a compact disc such as a CD, DVD, or recordable DVD that is placed into a tray for processing, such as for laminating a film over the disc, is not properly located in the support tray. For example, a disc may be offset or partially out of a locating recess, or two discs may be dropped on the tray, and such error will be sensed to stop the process and avoid damaging the processor and the disc.

Laminating a protective film on the top of a CD, DVD, or similar compact discs has been carried out to preserve and enhance the appearance of any printing that might be on the disc, and also to protect decorative or identifying logos, as well as provide holograms used for security.

The laminators, as well as other processors, include an extendable and retractable disc support tray, that in its extended position can be loaded with a disc or unloaded, and when retracted position the disc for the process, such as laminating. From time to time, particularly with automated handling equipment, a disc may not drop into the disc locating recess or other positioning guide that is provided on the tray, a portion of the disc will be raised from its correct position for processing and portions of the disc will interfere with the lamination rollers or other processing equipment and cause damage to the processor, the disc or both. Additionally, from time to time two discs may be dropped onto the tray or disc carrier, so that the overall height of the work piece on the disc carrier is excessive and may cause damage when fed into the processing position. In both cases there would be a failed lamination that needs to be flagged so the improperly processed disc can be removed.

SUMMARY OF THE INVENTION

The present invention relates to a sensor for sensing when a disc or other substrate on a processor disc carrier is not positioned properly, so that a portion of the disc or substrate projects upwardly from its normal position. The ability to detect this error in positioning of the disc or substrate that is to be processed is important so that an error signal can be provided and the processing stopped or interrupted before damage occurs because of the substrate error or before an improperly processed disc is placed into the finalized bin.

In present disc processors, a disc carrier or tray is power driven between an extended loading and unloading position and a retracted position wherein the disc is processed. In the form shown a laminating film is placed onto the substrate or disc in the carrier or tray, as is disclosed more fully in U.S. patent application Ser. No. 10/688,862 filed Oct. 17, 2003, which is incorporated by reference.

Once the disc is placed on the extended tray and the tray starts to retract, a height detector roller will be rotated if the disc exceeds the desired height. The roller drives a shaft to, in turn, rotate a rotation sensor, as shown an encoder wheel that cooperates with an optical sensor that monitors the movement of the encoder wheel. If motion is detected at a rate comparable to the tray or other disc carrier speed, the processor is stopped.

A processor is used to evaluate the shaft encoder signal rate (a series of pulses are provided from the optical sensor) to eliminate false errors due to an inadvertent movement caused by vibration or due to an oscillating signal caused by the wheel being positioned with the sensor right at the edge of one of the signal generating segments of the wheel.

Once an error signal is delivered, the operator corrects the error and restarts the lamination or other processing.

The location of the error sensing roller is important to satisfactory operation, because the sensor needs to precisely determine the height of a disc on the disc tray. The recess in a standard tray is nominally only about 0.037 inches deep, so that if a disc is misplaced, it is raised only approximately that amount, or 0.037 inches, when an edge portion of the disc is outside the recess or other disc locator. There are a number of variables involved, such as manufacturing tolerances in the processor, as well as variations of disc thickness and flatness that must be taken into account.

In order to position the sensing wheel precisely, a shaft support or mounting lever system is utilized. Also, there are small projections along side the disc locator that protrude a short distance above the surface of the tray. The projections are small balls positioned immediately adjacent to the disc recess in the tray. If a disc is not within the boundaries of the recess, such disc will be raised by the height that the balls extend above the tray surface, so that the sensor wheels can more easily sense the misportioned disc in order to insure adequate response.

The sensor is reliable, easy to use, and is low cost.

DETAILED DESCRIPTION OF THE PREFERRED EMBODIMENTS

Figure 1:
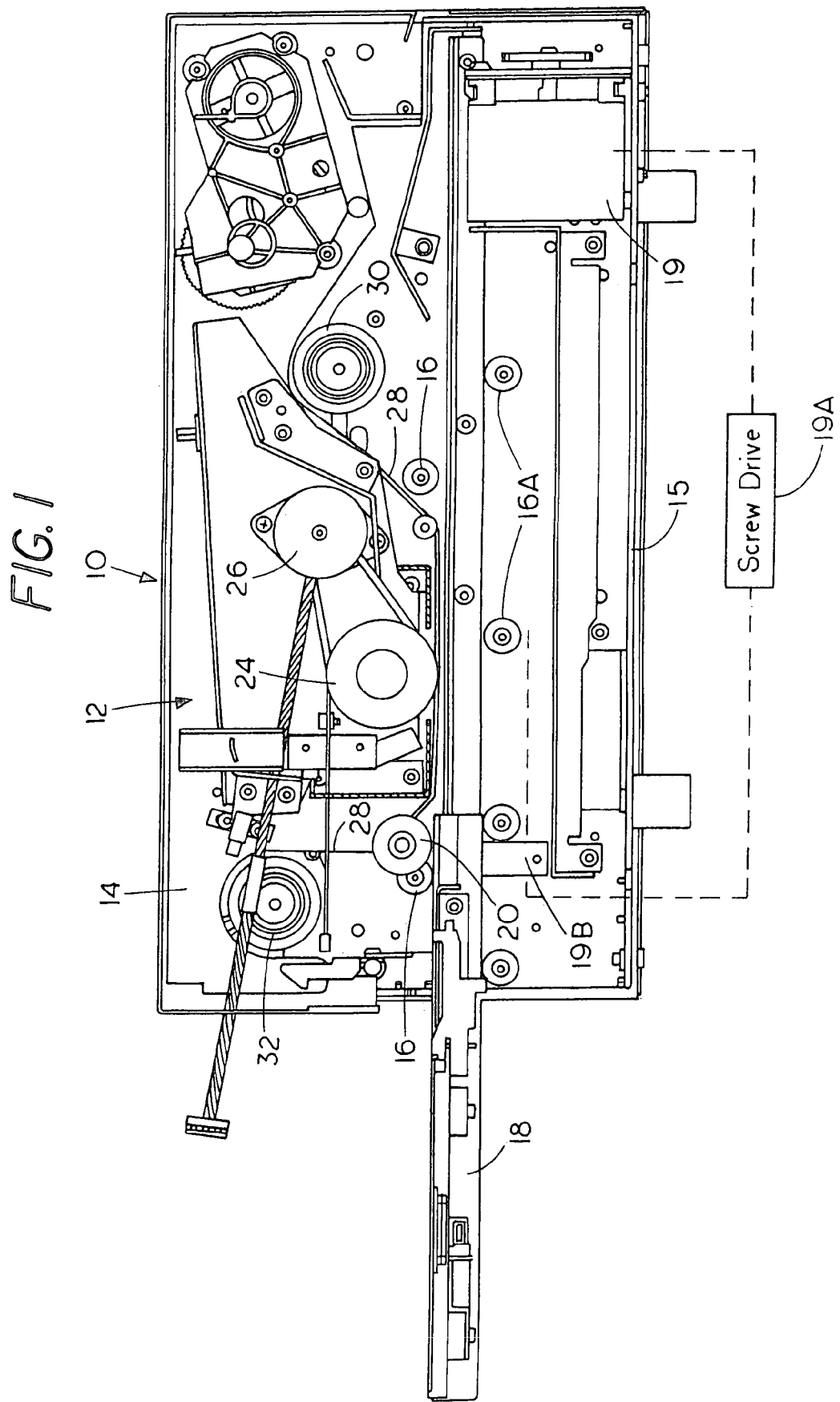
FIG. 1 is a side sectional view of a typical processor comprising a laminator having an error detection system made according to the present invention installed thereon.

As shown in FIG. 1, a laminator or processor indicated generally at 10 is generically a processor that is used for performing a work operation on a disc such as a CD, DVD, recordable DVD or the like. In this case, the processor or laminator 10 laminates a protective film onto a surface of an optical disc to provide a seal for printing holograms or other ID marks. The general layout of the laminating apparatus is known, and includes an outer frame 12 that has spaced side plates 14 that are joined with a bottom plate 15 to form the mainframe 12. The bottom plate 15 and side plates 14 are used for mounting rollers, a disc feed tray or conveyor, motors and other components and drives.

Figure 3:
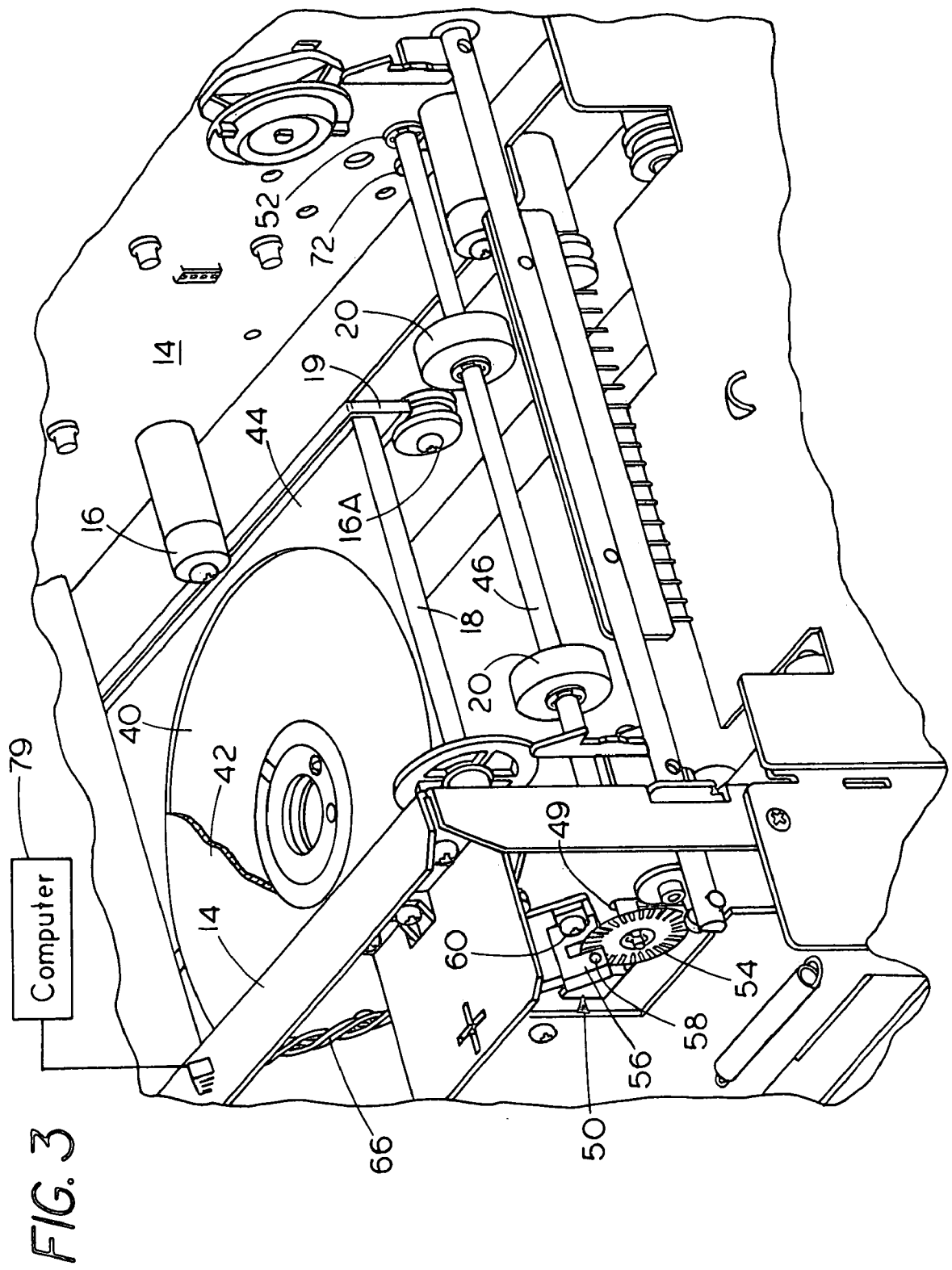
FIG. 3 is a fragmentary perspective view of a laminator having the sensor system, showing a disc feed tray in its retracted or processing position.
Figure 4:
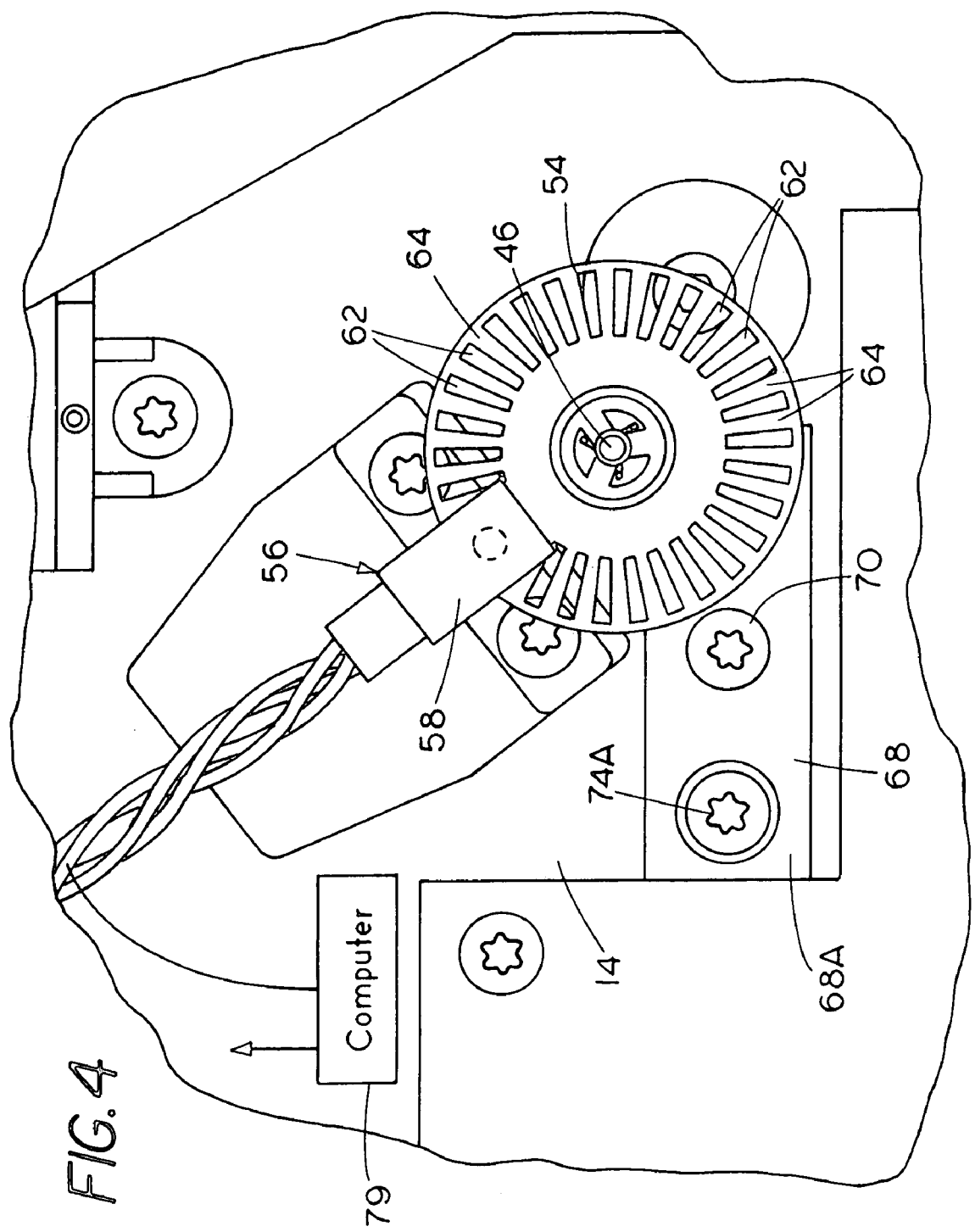
FIG. 4 is a side elevational view of an encoder on a sensing roller shaft used with the present invention.

The laminator 10 includes a series of spaced apart sets of rollers 16 and 16A that are used for supporting a disc feed conveyor or tray 18 that is provided with a recess on the top for positioning and supporting a CD, DVD or other disc or substrate which is to be processed. In this case the substrate has a protective film layer laminated thereon. The rollers 16A on one side of the tray are grooved, as shown in FIG. 3 to receive an edge frame 19 of the tray 18. Other rollers 16 use smooth surface rollers that merely hold and guide the tray in its path of movement.

A pair of sensing rollers 20, which are shown in FIG. 1, form part of the sensing system. The rollers 20 are used to sense when a disc or other substrate to be processed is not properly positioned on the tray 18 as the tray is moved through the processing station.

The tray 18 is driven between an ext,ended or loading position shown in FIG. 1 to a processing position, wherein it is retracted, and moves inwardly past the laminating roller 24 or other processing station. The tray 18 is driven with a motor 19 driving a longitudinal screw drive 19A with a traveling nut 19B connected to the tray in a known manner, and thus shown only schematically. The tray is reversed in direction applying the laminate film. The laminating roller 24 is driven from a motor 26 through a suitable belt coupling. The laminating roller 24 is a heated roller that laminates a film from a web 28 onto the disc or other substrate in a normal manner. The web 28 is removed from a supply roller 30, and is threaded under the laminator roller over to a take up roll 32, on suitable guides that can be arranged in any desired configuration.

The laminating roller 24 has a soft outer cover that bears against the web 28 and the heat from the roller 24 will cause the film carried on the web to adhere to a disc or substrate and protect the surface of the disc that is present in tray 18 as it moves underneath the roller. Substrates such as mini CDs, plastic business cards, and other cards or discs (generally called discs) of various sizes and shapes can be processed.

Figure 7:
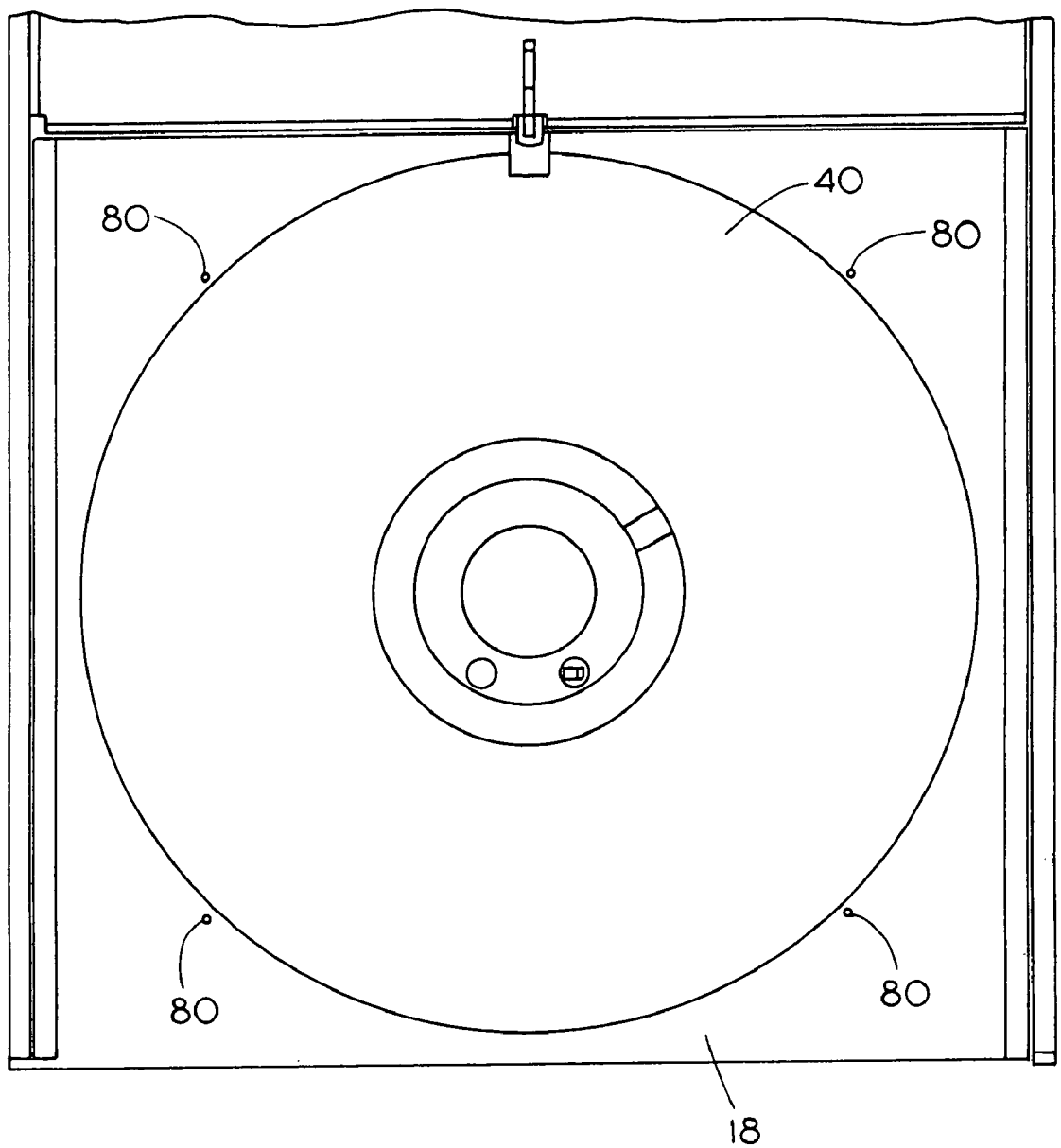
FIG. 7 is a top plan view of a disc feed tray showing edge projections used for insuring that a misplaced disc will be sensed.

Loading of the discs onto the tray 18 can sometimes result in a disc not being properly positioned in the recess of the tray or not in other disc locators on the tray. In the top view of the tray shown in FIG. 7, it can be seen that the tray 18 has a center portion forming a recess 40, which is of size to support a disc that is shown fragmentarily at 42 in FIG. 3. The disc fits within the recess 40, and when properly located will extend above the top surface 44 of the tray only a short distance.

Figure 6:
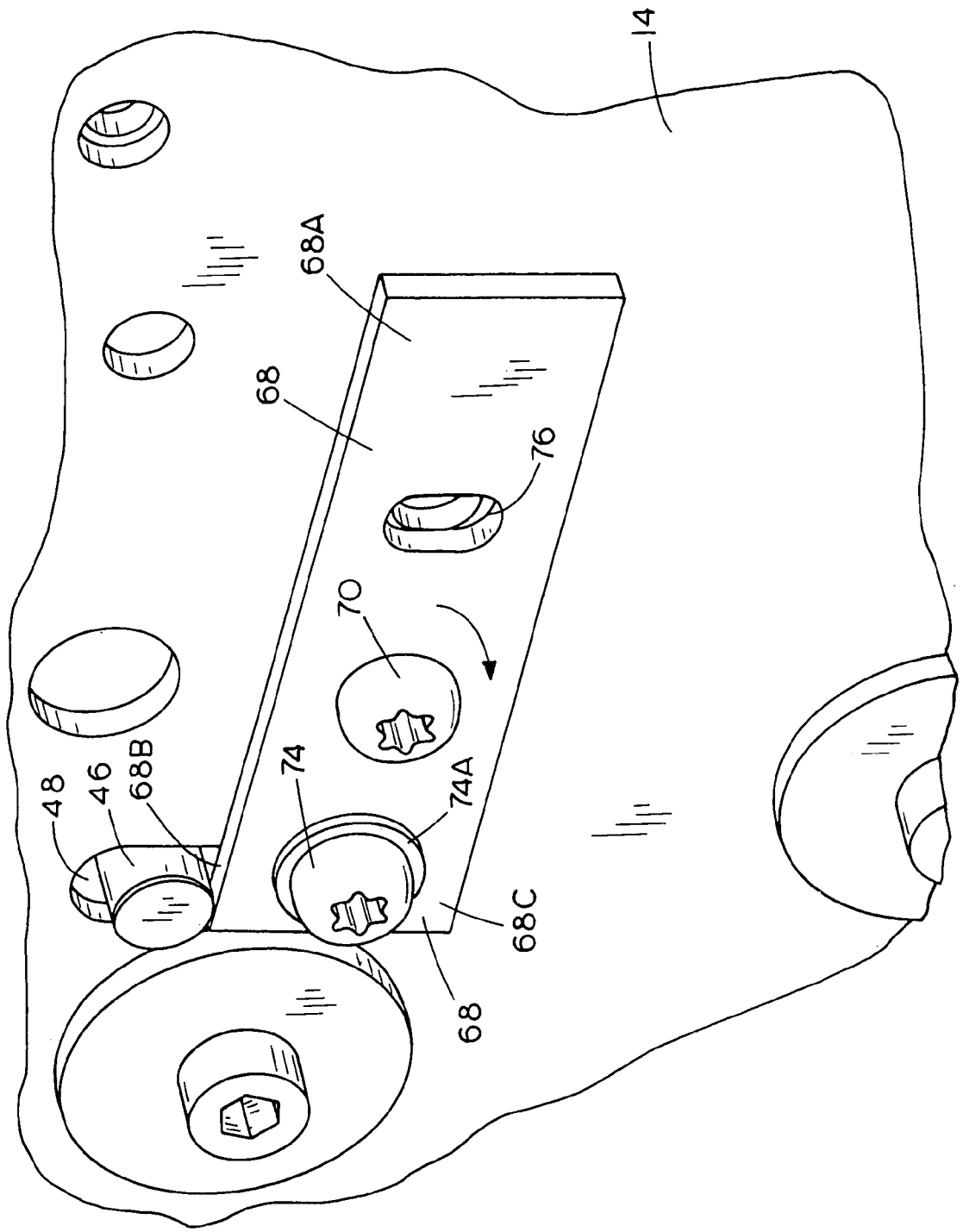
FIG. 6 is a perspective view of an opposite side of the processor or laminator from FIG. 5 showing the support for the Opposite end of the sensing roller shaft.

The disc error sensing rollers or wheels 20 are mounted onto a shaft 46 that extends across the frame, and through vertical slots 48 and 49 in the side walls 14. As can be seen, there are two of the sensing rollers or wheels 20 on shaft 46 that are above the tray 18 and overlie portions of a disc 42 in the recess 40 as the tray 18 is moved between extended and retracted portions. The rollers 20 are drivably mounted onto the shaft 46. The slot 48 for the shaft 46 is shown in FIG. 6 in one side wall 14. Slot 49 can be seen in FIG. 3, adjacent a sensor assembly 50 that is used for sensing when the shaft 46 is rotating. Also as can be seen in FIG. 3, the shaft 46 can have clips 52 on the insides of the side walls 14 to retain the shaft from axial movement. The shaft 46 is supported, as will be explained, so it can rotate freely in the slots 48 and 49 without any bearings, but it will not slide axially. The rollers 20 are thus positively positioned laterally to overlie the disc on the tray 18.

Figure 5:
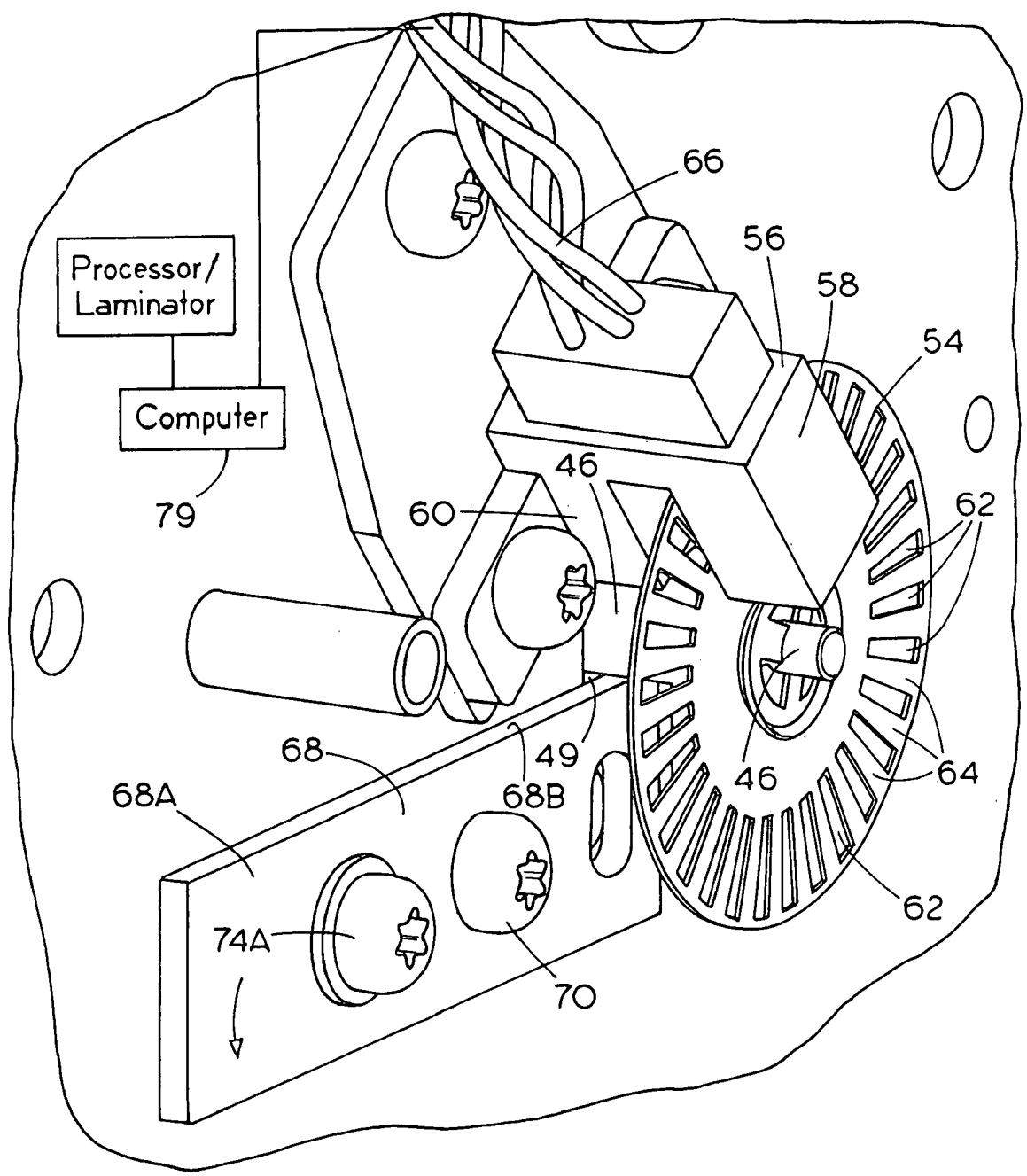
FIG. 5 is a perspective view of the encoder assembly of FIG. 4 showing a support for the sensing roller shaft mounting error sensing rollers.

The sensor assembly 50, as shown, includes an encoding wheel 54 that is drivably mounted onto the outwardly extending end of the shaft 46, and which is positioned between two legs of an optical sensor 56. Optical sensor 56 is a conventional sensor that has a light source in one leg 58, and a light sensitive receiver in a second leg 60 which is on the opposite side of the encoder wheel 54 from leg 58. The encoder wheel 54, as can perhaps best be seen in FIG. 5, has a plurality of apertures 62 that are spaced at equal intervals, leaving light blocking segment 64 of the wheel 54 between adjacent apertures 62.

The optical sensor 56 provides signals along lines 66. The light from the light source on the leg 58 is blocked from the light receiver on the leg 60, when a segment 64 is between the legs, and light is received when an aperture 62 is between the legs 58 and 60 so there are two different conditions that provide electrical signals from the light receiver. If the shaft 46 rotates, there will be pulsing signals indicating that the shaft is rotating and also indicating the speed at which the shaft is rotating.

The shaft 46 is supported on the top edge of levers on the external sides of the side walls 14. A first lever 68 is shown in FIG. 6. The levers are provided with pivot holes and a pair of slots. A pivot bolt or screw 70 is mounted in the pivot hole, and is threaded into a nut attached to the inside of wall 14 as shown fragmentarily at 72 in FIG. 3. The lever 68 is made so that the opening for receiving the pivot screw 70 is not in the longitudinal center of the lever. The lever 68 has an end portion 68A that is greater length from the pivot screw 70 than the end portion 68C having the slot in which an adjustment screw 74 is mounted. The adjustment screw 74 is positioned in one slot 76 on the lever and has a washer 74A underneath the head of the screw.

When the lever 68 is placed against the side plate 14, and the pivot screw 70 is put into place without tightening it down, the force of gravity on the longer end portion 68A will tend to pivot the lever in clockwise direction as indicated in FIG. 6, which will bring the upper edge 68B of the shorter end portion 68C of the lever to rest against the shaft 46. There are levers 68 on both of the side walls 14 for supporting shaft 46.

Figure 2:
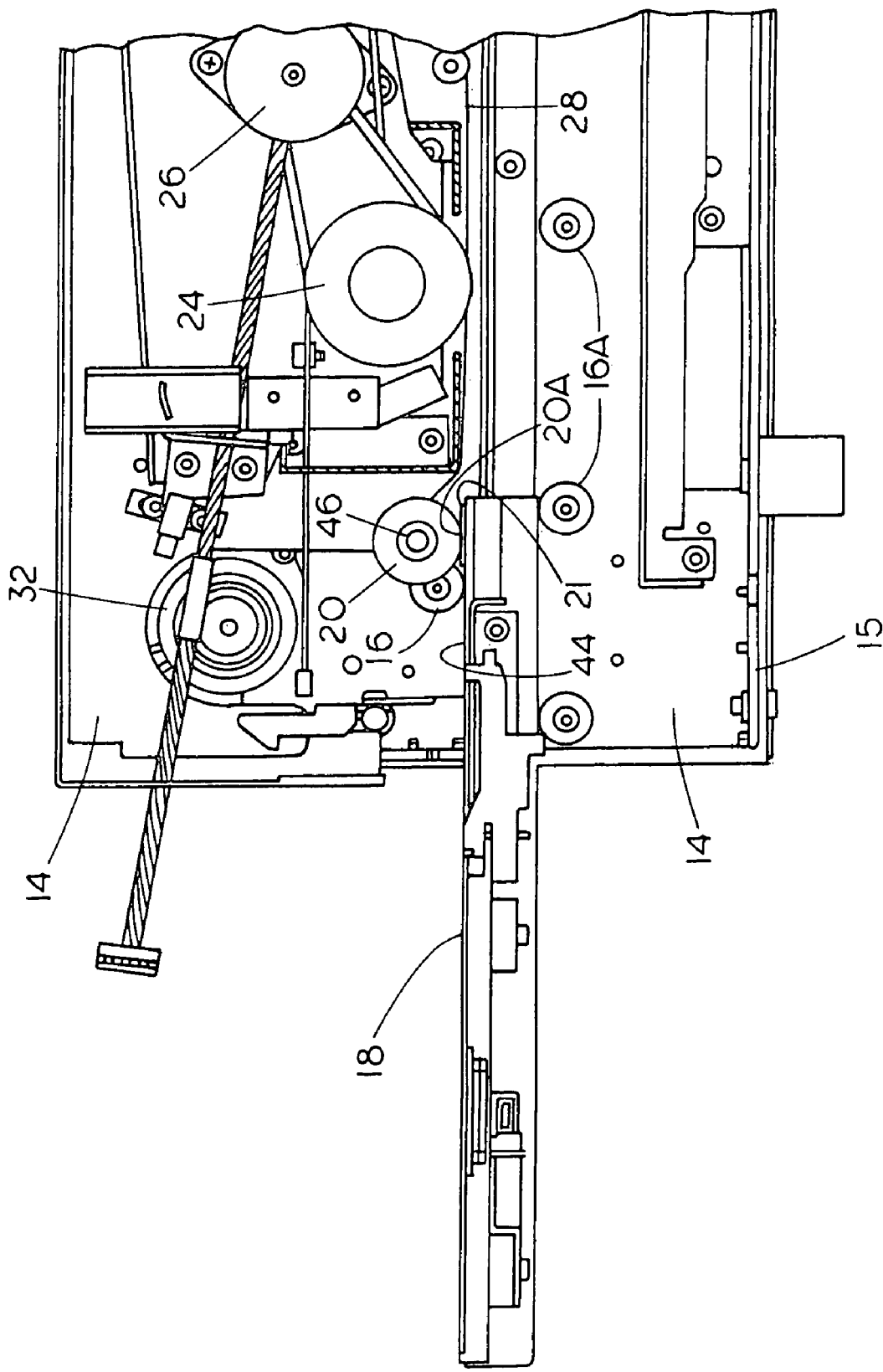
FIG. 2 is an enlarged fragmentary sectional view of a portion of FIG. 1.

When the shaft 46 is to be installed, the shaft 46 and the rollers 20 are in place on the shaft is positioned in the slots 48 and 49. The tray 18 is moved to underlie the rollers 20, and shims 21 are placed between the upper surface 44 of the tray 18 and lower tangent line 20A of the rollers 20 (See FIG. 2) to space the bottom of the rollers 0.030 inches (in the case of a standard thickness CD) above the upper surface 44 of the tray 18. Then, the levers 68 are put into place with pivot screws 70 loose to let the levers pivot under gravity so the upper edges bear against the shaft 46, lightly. The position of the shaft 46 as supported by tray 18 and the rollers supported on the shims can be maintained by tightening the adjustment screw 74 first, which tightens in clockwise direction in FIG. 6 and will push the pivot screw 70 down against the lower edges of the opening in the side wall 14 that supports the pivot screw. As gravity will hold the pivot screw to this position as well, the location of the underside of the shaft 46 is maintained by the lever. Then the pivot screw 70 can be tightened to securely clamp the lever 68 on the side of the unit shown in FIG. 6 tightly.

Referring to FIG. 5, a lever 68 is again in place against the lower side of shaft 46, where the encoder wheel 54 is mounted. A pivot screw 70 is put into place, and the opposite end slot 76 (in lever portion 68A) is used on this side of the processor for a tightening screw 74A. The outer end portion 68A of the lever 68A is the longer end of the lever from the bore for the pivot screw 70, so that the lever 68 will tend to rotate in counterclockwise direction under gravity about the screw 70 when first installed. This will again bring the edge surface 68B against the underside of the shaft 46, and will urge the pivot screw 70 to the bottom of the bore for the pivots screw in that side wall 14. Tightening the screw 74A will urge the lever down against the pivot screw 70. Clearance between the pivot pin 70 and the pivot opening in the lever 68 has been taken up by gravity force, and the tightening will not cause any misalignment or movement as the clamp screw 74A is tightened. Screw 70 is then tightened to secure this lever 68.

The shims 21 then would be removed from under the rollers 20 and the processor would be ready to be used.

The tray error sensing rollers 20 are spaced from a disc or substrate that is properly in the recess 40. If an extra thick disc, a double disc or a disc that is not properly seated in the recess 40 passes under these rollers 20, the rollers will be caused to rotate. The rotating rollers 20 will rotate the shaft 46, and also the encoder wheel 54. The optical sensor 50 monitors the encoder wheel, and if motion is detected at a rate comparable to the tray feeding speed, which can be determined by the signal sent along the lines 66, the laminator or processor is stopped because there is an indication of an error in feed that could cause damage to the processor and the disc. The encoder signal rate is evaluated in a control computer 79 to eliminate a false error signal due to inadvertent movement of the wheel 50 caused by vibration, or due to an oscillating signal caused by the encoder wheel being positioned in the sensor 50 right on the edge of one of the timing segments 64.

Once the computer 79 determines that an error has occurred, and the processor or laminator is stopped, an operator needs to correct the error and restart the job.

It has been noted that the tray recess 40 is nominally only 0.037 inches deep, and therefore a disc is raised only approximately 0.037 inches when an edge portion of a disc is outside of the recess and above surface 44. When combined with all the variables involved, such as part tolerances, as well as disc thickness tolerances and flatness tolerances of the disc, there is almost no tolerance for height error of rollers 20. To arrange to have more tolerance for operation, the tray 18 is provided with projections above surface 44 adjacent the edge of recess 40. As shown there projections are four spheres or balls shown at 80 in FIG. 7.

Figure 8:
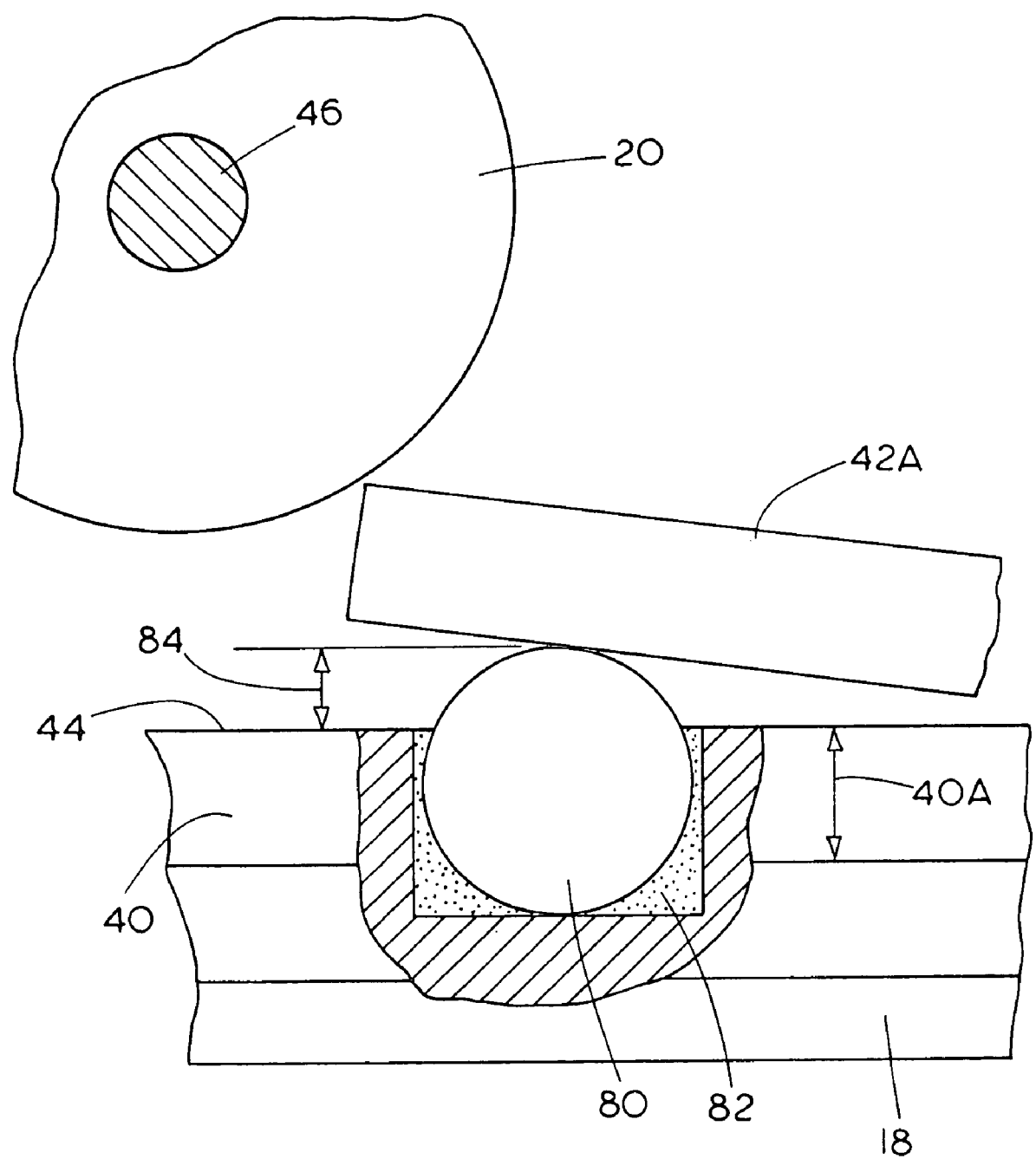
FIG. 8 is an enlarged view of a typical ball used as the projection shown in FIG. 7.

The enlarged cross sectional view of FIG. 8 shows the tray recess dimension in vertical direction by the double arrow 40A. The tray 18 in regions alongside the recess 40 is provided with a selected number receptacles 82 that receive the ball 80, and the ball then projects above the surface 44 of the tray approximately 0.012 inches, as indicated by the double arrow 84. The ball 80 is secured in the recess with a suitable adhesive. The ball upper surface, which is part spherical, is such that if a disc slides out of the tray recess 40 it would slide up over one or more of the balls 80 and be positioned generally as indicated schematically at 42A in FIG. 8. This would raise the disc 42A higher than without the balls, so that it was insured that a roller 20 indicated fragmentarily in FIG. 8, would engage the misplaced disc 42A and start to rotate.

The shaft 46 is mounted in the slots 48 and 49 in the side panels 14, so that the rollers 20 can raise and lower slightly. As long as the rollers 20 engage the misplaced disc 42A as the tray progresses, the shaft 46 and encoder wheel 54 will rotate and provide the error signal indicating that a disc 42 is not properly located in the recess 40.

The error signaling rollers can be made of a suitable material that has somewhat resilient and high friction. The shaft 46 will rotate easily in its mountings. The shaft 46 is positively positioned by shimming the roller 20 at the proper height as explained, and then making sure that the shaft position does not change when the levers 68 that support the shaft are tightened down, so that disc errors can be detected. While the spheres or balls 80 shown in FIG. 8 are helpful in insuring that a disc error will be sensed, the balls are not absolutely necessary, but add an additional factor for satisfactory operation.

The tray 18 is generally a conveyor to move the object to be processed to the processing station, and thus the present error detection system will work with other conveyors or causing the carriers or conveyors may have other disc positioning devices other than a recess, as well.

It is also apparent that other types of sensors that sense shaft rotation can be utilized, and that the optical sensor and encoding wheel is only one of the many forms of sensors that could be provided for determining when the disc error wheels or rollers 20 are rotated.

Although the present invention has been described with reference to preferred embodiments, workers skilled in the art will recognize that changes may be made in form and detail without departing from the spirit and scope of the invention.

What is claimed is:

1. In a processor system for processing an object supported on a tray that moves in and out of a processing station, the improvement comprising a rotatable roller positioned a selected distance spaced above an upper surface of the tray such that the roller clears a properly positioned object on the tray, and aligned with the path of the object as the tray moves in and out of the processing station, the selected distance positioning the roller to be intercepted by an object on the tray at a position other than the proper position and rotated as the tray moves to the processing station, and a sensor to sense rotation of the sensing roller and provide a signal indicating rotation of the roller.

2. The processor system of claim 1, wherein the object is a flat substrate and said tray has a recess for receiving the substrate for transporting the substrate into and out of the processing station, and wherein the selected distance is such that the roller clears the substrate when the substrate is positioned in the recess.

3. The processor system of claim 1, wherein there is a shaft mounting the roller and the shaft extends across the tray.

4. The processor system of claim 3 wherein the processing station is in a housing having spaced side walls, and wherein the shaft extends between the side walls, and wherein the tray is positioned between the side walls.

5. The processor system of claim 1, wherein there is a shaft supporting the sensing roller, and wherein the sensor comprises an encoder coupled to the shaft to indicate rotation of such shaft.

6. The processor system of claim 5, wherein said encoder comprises a rotating disc that rotates with the shaft, and a member that is mounted on a housing forming part of the processor system and which member provides a signal when the disc rotates.

7. The processor system of claim 4, wherein said shaft is supported relative to the side walls on upper edges of levers on opposite sides of the housing, and wherein each lever is supported on a pivot and is of unequal length between the pivot and the opposite ends of the levers, such that the levers tend to rotate under gravity to engage the shaft when the levers are unrestrained from pivoting.

8. The processor system of claim 7, and a clamp screw for clamping each lever into position after the respective lever has engaged an underside of the shaft under gravity.

9. The processor system of claim 1, wherein said object is a disc that is circular in periphery, and wherein the tray has a circular recess for receiving the disc.

10. The processor system of claim 9, wherein said processor system comprises a laminator for laminating a sheet onto a disc carried by the tray into the processing station.

11. A processor system including a sensing roller assembly mounted relative to a movable conveyor that has a substrate receiver on an upper surface thereof for receiving a substrate of a known thickness, for processing, the sensing roller assembly detecting a substrate on the movable conveyor which is at least partially out of the receiver to thereby project above the conveyor a greater distance then when in the receiver, an unpowered freely rotatable sensing roller, a support to rotatably mount the sensing roller spaced from the upper surface of the conveyor a distance to clear a substrate positioned in the receiver and to be engaged by a substrate at least partially out of the receiver and positioned in a path of movement of the substrate when the substrate is supported at least in part by the conveyor, whereby a substrate on the conveyor and at least partially out of the receiver rotationally drives the sensing roller when the conveyor moves the substrate past the sensing roller, and a sensor to sense rotation of the sensing roller and provide an output signal when the sensing roller is rotated.

12. The processor system of claim 11, wherein said conveyor comprises a tray reciprocating in the path of movement, the tray having a recess comprising the receiver of size to receive a substrate comprising a flat substrate, and at least one projection adjacent to the recess that extends a selected distance above the upper surface of the tray to raise a portion of a substrate on the tray that is at least partially out of the recess.

13. The processor system of claim 12, wherein said sensing roller is mounted onto a shaft that overlies the tray.

* * * * *